United States Patent
Shirakawa

(10) Patent No.: US 12,067,468 B2
(45) Date of Patent: Aug. 20, 2024

(54) LEARNING MODEL MANAGEMENT SYSTEM, LEARNING MODEL MANAGEMENT METHOD, AND RECORDING MEDIUM

(71) Applicant: CANON KABUSHIKI KAISHA, Tokyo (JP)

(72) Inventor: Yuki Shirakawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 969 days.

(21) Appl. No.: 17/079,873

(22) Filed: Oct. 26, 2020

(65) Prior Publication Data
US 2021/0158213 A1    May 27, 2021

(30) Foreign Application Priority Data

Nov. 22, 2019    (JP) .................................. 2019-211869

(51) Int. Cl.
| | |
|---|---|
| *G06N 20/00* | (2019.01) |
| *G06F 18/21* | (2023.01) |
| *G06F 18/214* | (2023.01) |
| *G06N 20/10* | (2019.01) |

(52) U.S. Cl.
CPC .......... *G06N 20/10* (2019.01); *G06F 18/214* (2023.01); *G06F 18/2178* (2023.01); *G06N 20/00* (2019.01)

(58) Field of Classification Search
CPC .... G06N 20/00; G06N 20/10; G06F 18/2178; G06F 18/217; G06F 18/214
USPC ........................................................ 706/12
See application file for complete search history.

(56) References Cited

U.S. PATENT DOCUMENTS

| | | | |
|---|---|---|---|
| 2016/0371601 A1* | 12/2016 | Grove .................... | G06N 20/00 |
| 2017/0154294 A1* | 6/2017 | Morimoto ........ | G06Q 10/06398 |
| 2017/0220407 A1* | 8/2017 | Estrada ............... | G06F 11/3495 |
| 2017/0364967 A1* | 12/2017 | Parikh .................... | G06N 20/00 |

(Continued)

FOREIGN PATENT DOCUMENTS

JP    6531821    6/2019

OTHER PUBLICATIONS

"System for parallel machine learning models deployment and continuous learning", IPCOM000255014D, Aug. 24, 2018. (Year: 2018).*

(Continued)

*Primary Examiner* — Hwei-Min Lu
(74) *Attorney, Agent, or Firm* — VENABLE LLP

(57) ABSTRACT

A learning model management system executes a provisional evaluation when the number of feedback data is equal to or less than a threshold of a definite evaluation but is more than a threshold of a provisional evaluation. In this provisional evaluation, prediction accuracy of the learning model that is in operation is evaluated a plurality of times, and whether or not the prediction accuracy of the learning model that is in operation is in a deterioration trend is determined based on the change tendency of the evaluation results. If it is determined that the prediction accuracy of the learning model that is in operation is in a deterioration trend, the learning model management system provides a notification about the deterioration trend of the prediction accuracy to a manager to cause him/her to increase the number of feedback data up to a number that enables the definite evaluation.

7 Claims, 9 Drawing Sheets

(56) References Cited

U.S. PATENT DOCUMENTS

| | | |
|---|---|---|
| 2018/0082185 A1 | 3/2018 | Tanimoto |
| 2019/0130303 A1* | 5/2019 | Bigaj .................... G06N 20/00 |
| 2019/0156247 A1* | 5/2019 | Faulhaber, Jr. ........ G06N 3/045 |
| 2019/0258900 A1* | 8/2019 | Baikadi ................ G06F 16/904 |
| 2019/0370602 A1* | 12/2019 | Haneda ................... G06N 3/08 |
| 2020/0160207 A1* | 5/2020 | Song .................. G06F 11/3466 |
| 2020/0184273 A1* | 6/2020 | Jannink ................ G06F 18/214 |
| 2022/0237407 A1* | 7/2022 | Umeda ............... G06F 18/2431 |
| 2022/0245405 A1* | 8/2022 | Katoh .................. G06F 18/217 |

OTHER PUBLICATIONS

Cerquitelli et al., "Automating concept-drift detection by self-evaluating predictive model degradation", arXiv Article 1907. 08120, Jul. 18, 2019, pp. 1-5. (Year: 2019).*

* cited by examiner

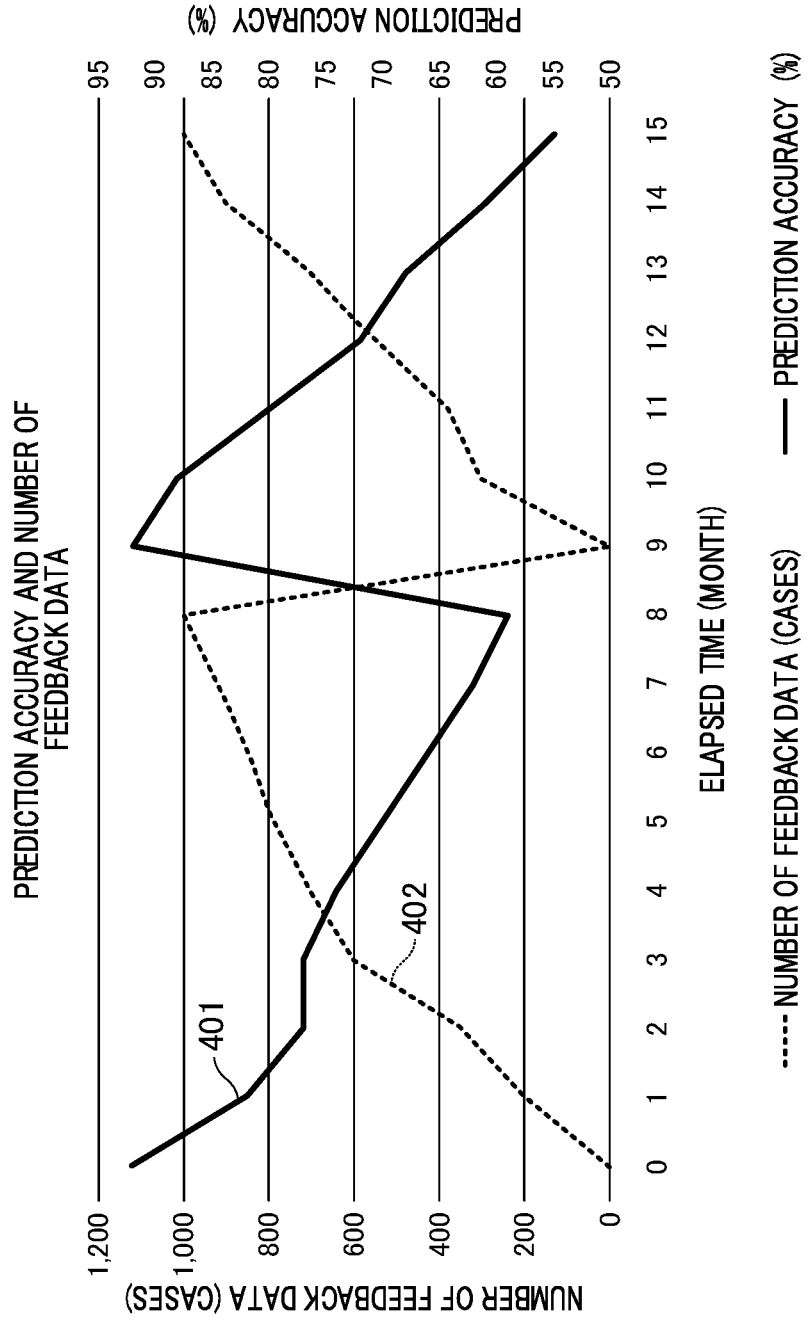

FIG. 8

Learning model management system

Settings related to collection of feedback data

Recommend user who is a target for collection of feedback data: ● Yes ○ No — 711

- Source of user information to use: [user_table ▾] — 721
- Source of feedback data to use: [feedback_data_table ▾] — 722
- Definition of attribute map: [attribute_map_real_estate ▾] — 723

731 {
● Prefer user having missing attribute
○ Specify attribute of user who is a target for collection of feedback data
}

741 {
☑ Gender: [Male ▾]
☑ Age: [25-29 ▾]
☑ Family structure: [One adult ▾]
☐ Annual income: [400-599 ▾]
}

Request user who is recommended to provide feedback: ● Yes ○ No — 751

Destination of user information source to be used when making request: [E-mail address ▾]

761 — Subject: [Please fill out the questionnaire.]

762 — Text:
763 —
$\{$ Mr./Ms. s (Username)$\}$
Thank you for always using our sample real estate.

Please fill out this questionnaire to help us make our service better.

★Input form
https://sample.com/feedback

[Save] 771   [Cancel] 772

FIG. 9

User who is a target for collection of feedback data attribute of collection target: —781
Age: 25 – 29
Annual income: 400 – 599 —782

| Customer name | Gender | Age | Family structure | Annual income | E-mail address | Address | Phone number | ... |
|---|---|---|---|---|---|---|---|---|
| XXX | Female | 25 | One adult | 400 | xxx@sample.com | Ota Ward, Tokyo | xxx-xxxx-xxxx | |
| YYY | Male | 27 | Two adults | 450 | yyy@sample.com | Ota Ward, Tokyo | yyy-yyyy-yyyy | |
| ZZZ | Female | 29 | One adult | 500 | zzz@sample.com | Kawasaki City, Kanagawa | zzz-zzzz-zzzz | |
| ... | | | | | | | | |

LEARNING MODEL MANAGEMENT SYSTEM, LEARNING MODEL MANAGEMENT METHOD, AND RECORDING MEDIUM

BACKGROUND OF THE INVENTION

Field of the Invention

The present invention relates to a technique that manages a learning model, and more in detail relates to a technique that enhances the reliability of managing a learning model when there is little learning data.

Description of the Related Art

In a system using a machine learning function, an operation starts after a learning model is adjusted in advance by using learning data. Generally, it is known that prediction accuracy of the learning model deteriorates with the passage of an operation time due to various reasons.

In contrast, a technique that recovers or improves the prediction accuracy from deterioration by periodically updating a learning model during operation of the system is known. For example, in a system disclosed in Japanese Patent No. 6531821, every time a predetermined amount of the learning data is stored, the prediction accuracy is automatically evaluated, and when the evaluation result is less than a reference value, relearning the learning model is performed. When it is determined that the prediction accuracy after relearning is more than the prediction accuracy of the learning model that is in operation, update processing for the learning model that is in operation is performed. The learning model disclosed in Japanese Patent No. 6531821 recovers and improves prediction accuracy by executing such a cycle as evaluation, learning, and update (hereinafter, referred to as a "continuous learning cycle").

In addition, the system disclosed in Japanese Patent No. 6531821 proposes a technique that performs evaluation between the relearned learning model and the learning model that is in operation taking into consideration an operation cost instead of simply comparing and evaluating the prediction accuracy between them.

As described above, the learning model can recover or improve the prediction accuracy from degradation by executing the continuous learning cycle. Here, in general, the reliability of the evaluation for the learning model depends on "variation", "amount", "newness", and the like of the learning data input to the learning model during evaluation. Specifically, in the evaluation of the learning model, there is a high possibility that a reliable evaluation result cannot be obtained even if the evaluation of the prediction accuracy is performed by using only a small amount of learning data, and thus, in many systems, evaluation is not performed when the learning data is less than a certain amount. Hence, in a system in which the frequency of the inflow of the learning data (collection frequency) is small, the frequency of executing the continuous learning cycle is small, and consequently, in many cases, the operation needs to be continued without change even in a state in which the prediction accuracy has deteriorated.

Therefore, in order to execute the continuous learning cycle at a sufficient frequency and maintain necessary prediction accuracy, learning data (in other words, feedback data from a user) needs to be continuously collected. However, performing an operation so as to actively continue to collect feedback data at all times increases operating costs for, for example, system resources.

SUMMARY OF THE INVENTION

The present invention provides a mechanism for improving a conventional continuous learning cycle.

A learning model management system according to an embodiment of the present invention is a system that performs performance evaluation of a learning model based on feedback data from a providing destination of an estimated result of the learning model comprising: a receiving unit configured to receive an input of information for specifying the number of feedback data required for performing the performance evaluation; an evaluation unit configured to perform provisional evaluation of the performance by a number that is smaller than the number of feedback data before feedback data having an amount that corresponds to the received input has been collected; and a providing unit configured to provide a notification corresponding to a deterioration of the performance if the deterioration of the performance of the learning model has been detected based on the result for the provisional evaluation performed a plurality of times.

Further features of the present invention will become apparent from the following description of exemplary embodiments with reference to the attached drawings.

BRIEF DESCRIPTION OF THE DRAWINGS

FIG. 4 is a graph illustrating the relation between the prediction accuracy of a learning model and the number of feedback data in each embodiment.

FIG. 8 illustrates a recommendation function according to Embodiment 2 where a conceptual diagram of a setting screen is shown.

FIG. 9 illustrates a recommendation function according to Embodiment 2, in which a table showing a recommend result is shown.

DESCRIPTION OF THE EMBODIMENTS

Embodiments of the present invention will be described below with reference to the drawings.

Embodiment 1

<Network Configuration>

Figure 1:
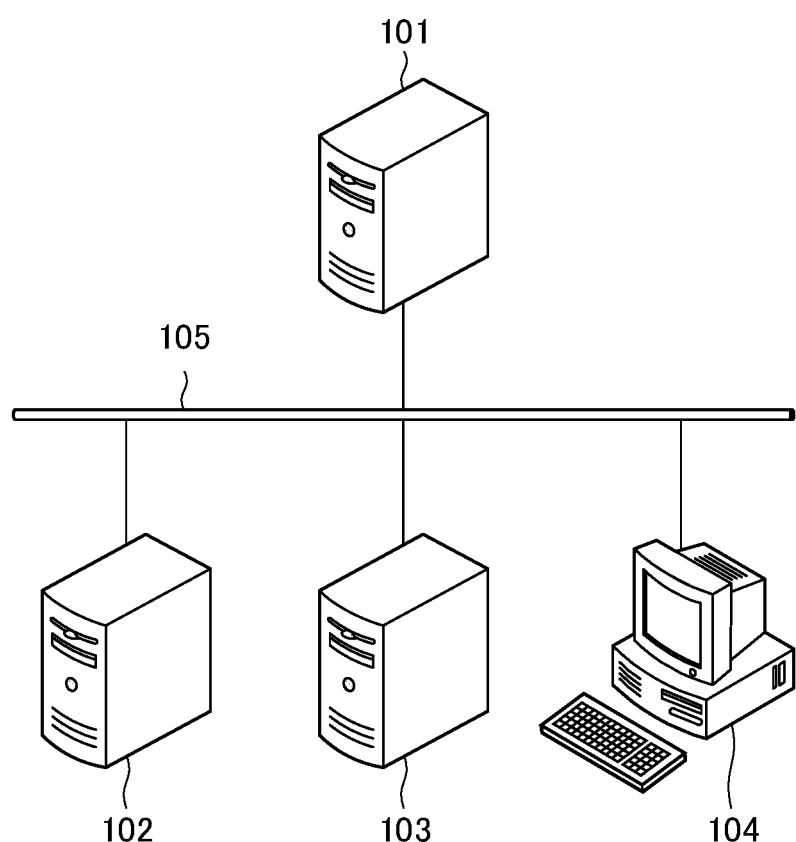
FIG. 1 is a conceptual diagram illustrating a network configuration according to each embodiment of the present invention.

FIG. 1 illustrates an example of a network configuration according to the Embodiment 1. As shown in FIG. 1, the system of the present embodiment includes a learning model management system 101, a prediction system 102, a business system 103, and a terminal 104. The systems 101 to 103 and the terminal 104 are connected to each other via a network 105.

The learning model management system 101 provides a function for executing a continuous learning cycle. Specifically, the learning model management system 101 has a function for executing evaluation, learning, and updating of a learning model, and has a plurality of types of data storage units (to be described below) for executing these functions.

The prediction system 102 is a system that provides a prediction function for an arbitrary event based on a learning model that is in operation (to be described below). The business system 103 provides a front-end function that receives a business request from the terminal 104, processes the request, and returns a response.

The terminal 104 is an information processing terminal for a user to execute desired processing. The network 105 is a communication network realized by any or combination of, for example, a LAN and a WAN, such as the Internet, a telephone line, a dedicated digital line, an ATM, a frame relay line, a cable television line, and a wireless line for data broadcasting.

Instead of the present embodiment, a configuration in which the business system 103 and the prediction system 102 are integrated may be adopted, or a configuration in which the learning model management system 101, the prediction system 102, and the business system 103 are integrated may be adopted.

<Hardware Configuration>

Figure 2:
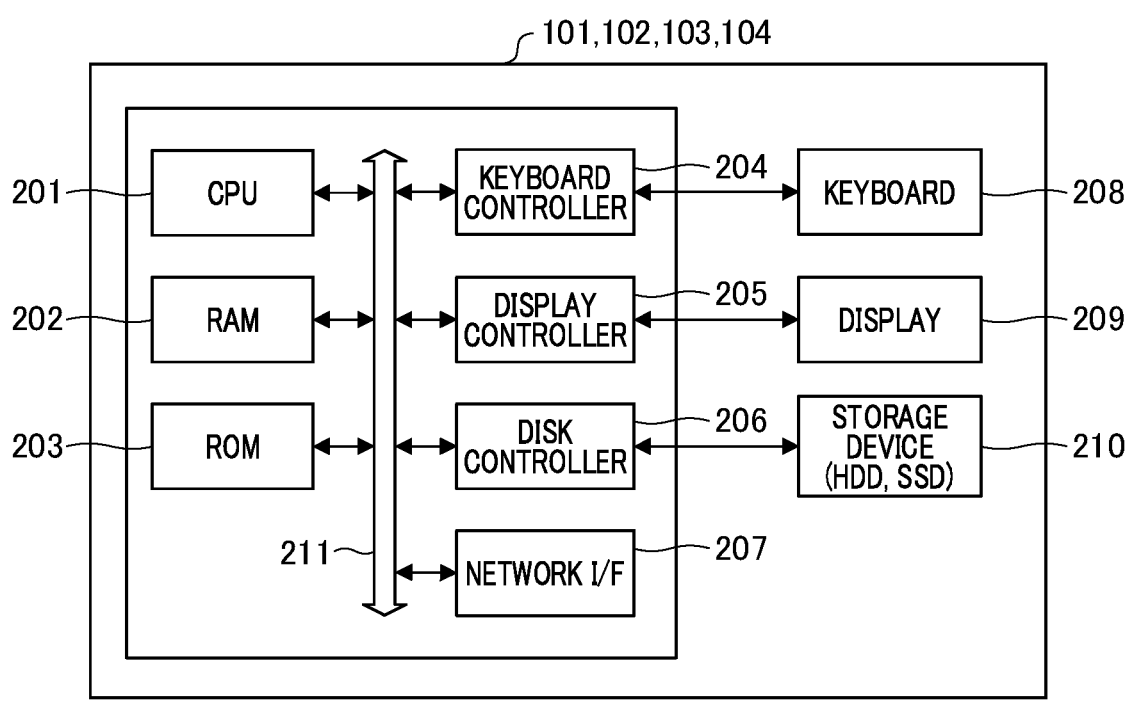
FIG. 2 is a block diagram illustrating a hardware configuration according to each embodiment.

FIG. 2 is a block diagram schematically illustrating an example of a hardware configuration of the learning model management system 101 used in the present embodiment. The hardware configurations of the prediction system 102, the business system 103, and the terminal 104 may be the same, and thus the description thereof will be omitted.

In FIG. 2, the CPU 201 (Central Processing Unit) controls the entire learning model management system 101 by, for example, operating various application programs in an operating system and executes various processes.

A RAM (Random Access Memory) 202 is used as a working area and the like of the CPU 201. A ROM (Read Only Memory) 203 stores a boot program. The CPU 201 starts an operating system by using this boot program.

A keyboard controller 204 receives an operation input from a keyboard 208 or a pointing device (not illustrated) such as a mouse, a touchpad, a touch panel, and a trackball.

A display controller 205 controls the display of a display 209. A disk controller 206 controls data access to a storage device 210 such as a hard disk drive (HDD) and a solid-state drive (SSD) that store various types of data.

A network interface 207 is connected to a network such as a LAN, and communicates with another device connected to the network. The internal bus 211 connects the CPU 201 to the RAM 202, the ROM 203, the various controllers 204 to 206, and the network I/F 207.

<System Configuration>

FIGS. 3A to 3D are block diagrams schematically illustrating an example of the software configuration according to the present embodiment. Hereinafter, the system configuration of the learning model management system 101, the prediction system 102, the business system 103, and the terminal 104 will be described with reference to FIGS. 3A to 3D, and subsequently, specific data and processes will be described.

Figure 3A:
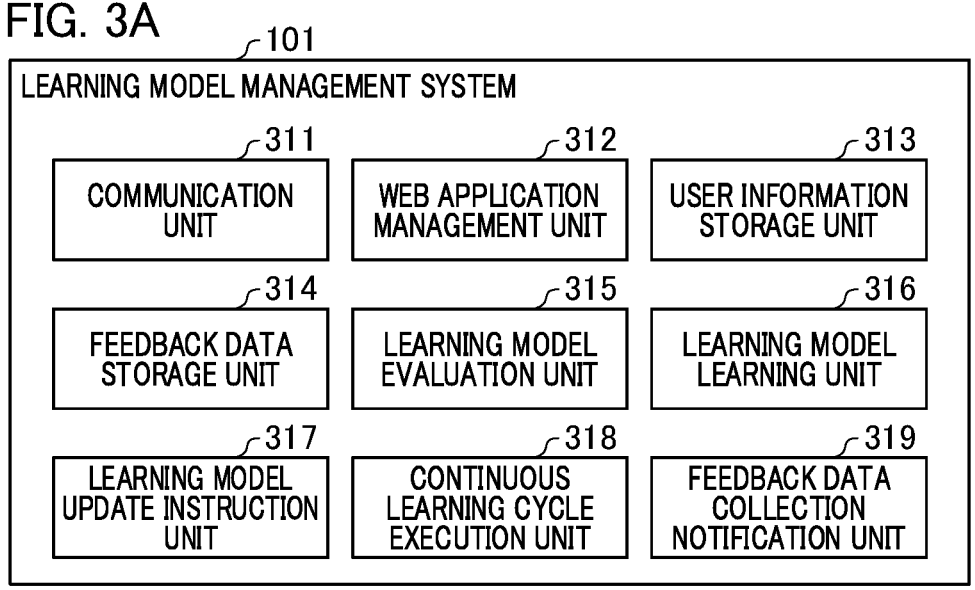
FIGS. 3A to 3D are block diagrams illustrating a software configuration according to each embodiment of the present invention.

FIG. 3A illustrates an example of the software configuration of the learning model management system 101. As described above, the learning model management system 101 provides a function for executing a continuous learning cycle.

A communication unit 311 is a software module for communicating with external devices such as the prediction system 102, the business system 103, and the terminal 104 via the network I/F 207.

A Web application management unit 312 is software that provides a Web application composed of a Web content such as HTML or JavaScript in response to a request from a Web browser 340 (to be described below) of the terminal 104. The Web application management unit 312 also provides a Web API for operating the Web application, and transmits and receives data to and from the business system 103 and the terminal 104.

A user information storage unit 313 is software that stores user information input from the business system 103 or the like, and compiles the user information into a database. The storage device 210 is used for storing data.

A feedback data storage unit 314 is software that stores feedback data input from the business system 103, the terminal 104, or the like to serve as learning data and compiles the feedback data into a database. The storage device 210 is used for storing data. In the present embodiment, it is assumed that the feedback data stored in the feedback data storage unit 314 is data collected from the user. Examples of data stored in the user information storage unit 313 and the feedback data storage unit 314 will be described below.

A learning model evaluation unit 315 is a software module that performs evaluation for a learning model. When the learning model evaluation unit 315 evaluates the learning model, the feedback data stored in the feedback data storage unit 314 are used as learning data.

A learning model learning unit 316 is a software module that generates a new learning model by learning the learning model. When generating the new learning model, the learning model learning unit 316 uses the feedback data stored in the feedback data storage unit 314 as learning data. The details of the operations of the learning model evaluation unit 315 and the learning model learning unit 316 will be described below.

A learning model update instruction unit 317 is a software module that determines whether or not to update an learning model 322 that is in operation being currently operated by the prediction system 102 to the new learning model that has been generated by the learning model learning unit 316. When determining an update of the learning model 322 that is in operation, the learning model update instruction unit 317 transmits an update instruction to a learning model update unit 323 of the prediction system 102.

A continuous learning cycle execution unit 318 controls the learning model evaluation unit 315, the learning model learning unit 316, and the learning model update instruction unit 317. By this control, the learning model evaluation unit 315, the learning model learning unit 316, and the learning model update instruction unit 317 execute the continuous learning cycle, that is, the repetition of evaluation, learning, and updating for the learning model 322 that is in operation. The specific process of the continuous learning cycle execution unit 318 will be described below.

A feedback data collection notification unit 319 is a software module that provides a notification to a destination registered in advance by means such as e-mail when it is determined that the collection of feedback data is necessary. The process contents of the feedback data collection notification unit 319 will be described below.

Figure 3B:
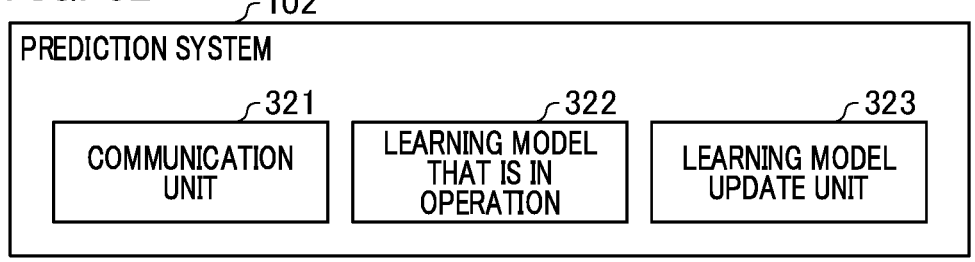

FIG. 3B illustrates an example of the software configuration of the prediction system 102. As described above, the prediction system 102 uses the learning model 322 that is in operation (to be described below) to provide a prediction function for a desired event.

A communication unit 321 is a software module for communicating with external devices such as the learning model management system 101, the business system 103, and the terminal 104 via the network I/F 207.

The learning model 322 that is in operation is a learning model actually operated. The learning model is a software module that outputs a prediction result with respect to input data. The operation of the learning model 322 that is in operation will be described below together with the operation of the learning model evaluation unit 315 and the learning model learning unit 316.

The learning model update unit 323 is a software module for updating the learning model 322 that is in operation in response to an instruction received from external systems such as the learning model management system 101 via the communication unit 321.

Figure 3C:
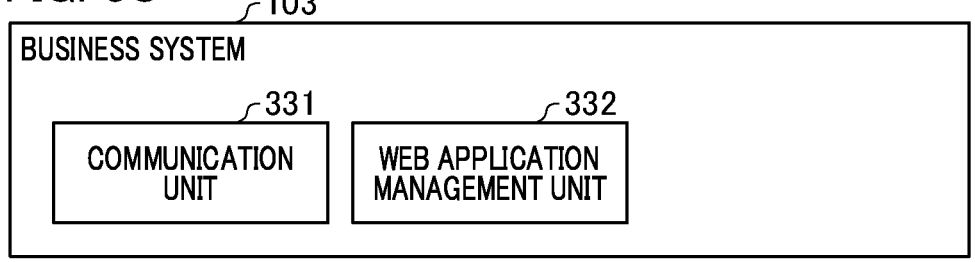

FIG. 3C illustrates an example of the software configuration of the business system 103. As described above, the business system 103 receives a business request from the terminal 104, processes the business request, and returns a response. Note that although the ordinary business system has various functions depending on the contents of the business, only the minimum description about the business system 103 necessary for understanding the features of the present embodiment will be performed.

A communication unit 331 is a software module for communicating with external devices such as the learning model management system 101, the prediction system 102, and the terminal 104 via the network I/F 207.

A Web application management unit 332 is software that provides a web application composed of Web contents such as HTML and JavaScript in response to a request from the Web browser 340 (to be described below) of the terminal 104. Specifically, the Web application management unit 332 provides a business application to the Web browser 340. The Web application management unit 332 processes the data input to the business application through the Web browser 340 and, if necessary, communicates with the learning model management system 101 and the prediction system 102. For example, when a user of the terminal 104 requests a prediction for a certain event by using a business application on the Web browser 340, the Web application management unit 332 requests the prediction system 102 to provide a result for the prediction. When the user of the terminal 104 inputs user information or feedback data to a business application on the Web browser 340, the Web application management unit 332 transfers the input data to the learning model management system 101.

Figure 3D:
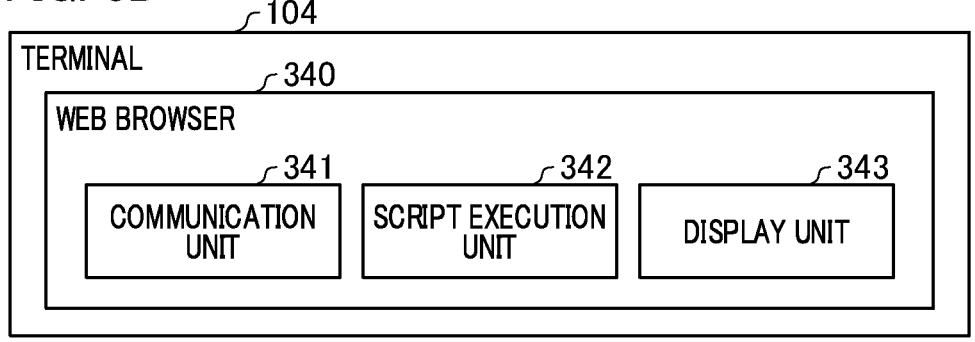

FIG. 3D illustrates an example of the software configuration of the terminal 104. The Web browser 340 includes a communication unit 341, a script execution unit 342, and a display unit 343.

The communication unit 341 is a software module for acquiring a Web application from the Web application management units 312 and 332 of the learning model management system 101 and the business system 103 via the network I/F 207.

The script execution unit 342 is a software module that analyzes and executes JavaScript and the like included in the Web application acquired by the communication unit 341. The display unit 343 is a software module that displays a user interface generated by the script execution unit 342 executing HTML, CSS, and Java Script.

In the present embodiment, although the user information and the feedback data are stored in the storage unit of the learning model management system 101, these data may be stored in a database or the like in the business system 103 and acquired by the learning model management system 101 as necessary. Additionally, although the terminal 104 uses the Web application to serve as a client application for communicating with the systems 101 and 103, a native application may be used.

Next, the operation of the learning model evaluation unit 315, the learning model learning unit 316, and the learning model 322, which is in operation, of the learning model management system 101 will be described.

In the present embodiment, a simple system for recommending a real estate property suitable for a user will be described as an example. The learning model 322 that is in operation is a learning model for outputting (estimating) a recommended property, based on the input data such as gender, age, family composition, annual income, and desired area. User information stored in the user information storage unit 313 is used for this input data. An example of the user information data is shown in Table 1. The user information in Table 1 is registered by, for example, a user who uses the system (for example, a service user and a customer) or an administrator (for example, a service provider and a sales representative).

TABLE 1

| User Table | | | | | | | | |
|---|---|---|---|---|---|---|---|---|
| Customer ID | Customer Name | Desired Area | Gender | Age | Family Structure | Annual Income | E-mail address | ... |
| C001 | AAA | Kawasaki ... | Female | 25 | 1 Adult | 400 | aaa@sample.com | |
| C002 | BBB | Yokohama ... | Male | 35 | 2 Adults | 600 | bbb@sample.com | |
| C003 | CCC | Ota ... | Female | 30 | 1 Adult | 500 | ccc@sample.com | |
| ... | | | | | | | | |

Next, a method by which the learning model learning unit 316 learns a learning model to be used as the learning model 322 that is in operation will be described. Table 2 shows an example of the learning data, that is, the feedback data from a user. These data are stored in the feedback data storage unit 314.

TABLE 2

Feedback Table

| Feedback ID | Property ID | Gender | Age | Family Structure | Annual Income | ... | Results |
|---|---|---|---|---|---|---|---|
| C001 | P001 | Female | 25 | 1 Adult | 400 | | Interested |
| C002 | P003 | Female | 25 | 1 Adult | 400 | | No Interest |
| C003 | P002 | Male | 35 | 2 Adults | 600 | | Interested |
| C004 | P004 | Male | 35 | 2 Adults | 600 | | No Interest |
| C005 | P003 | Female | 30 | 1 Adult | 500 | | No Interest |
| ... | | | | | | | |

The learning data is a combination of input data and teacher data (correct data) used when a learning model is learned. Among the items shown in Table 2, the input data are "Property ID", "Gender", "Age", "Family Structure", and "Annual Income", and the teacher data is "Result". Here, "Property ID" is an ID for specifying each property and indicates a set of properties corresponding to each "desired area" (refer to Table 1).

The learning model learning unit 316 performs learning based on a SVM (Support Vector Machine) that is one of pattern recognition models using "learning with a teacher" by using the feedback data of Table 2. Here, the SVM is merely an example, and various machine learning methods including a method using an algorithm that performs binary classification or a method using a neural network can be applied.

The feedback data in Table 2 may be input by a user who uses the system of the present embodiment through a means such as a questionnaire, or may be input by a manager based on an interview with the user. It is assumed in the feedback data of Table 2 that there are zero or more feedback data items per user. Finally, a method for evaluating the learning model 322 that is in operation by the learning model evaluation unit 315 will be described.

The learning model evaluation unit 315 causes the learning model 322 that is in operation to output (estimate) a recommended property by using the feedback data of Table 2, and calculates accuracy at that time to serve as prediction accuracy to evaluate this learning model 322 that is in operation. At this time, in order to obtain reliable prediction accuracy, it is desirable to use feedback data different from the feedback data that have been used during learning of the learning model among the feedback data of Table 2 to serve as feedback data for evaluation.

In the present embodiment, although the accuracy is used as an index of the prediction accuracy, other indexes such as precision and recall may be used depending on the characteristics of the learning model.

As described above, in the present embodiment, the learning model evaluation unit 315 causes the learning model 322 formed in the prediction system 102 and which is in operation to perform estimation. However, the same learning model may be deployed in the learning model management system 101 for reducing a load of the prediction system 102 and may cause the same learning model to perform an estimation.

As described above, in order to sufficiently increase the reliability of the prediction accuracy of the learning model, it is desirable to evaluate the learning model by using a sufficient amount of learning data with respect to the number of input parameters of the learning model.

FIG. 4 is a graph showing the relation between the prediction accuracy and the number of feedback data of the learning model 322 that is in operation. In FIG. 4, a solid line 401 represents a temporal change in the prediction accuracy of the learning model and a dotted line 402 represents a temporal change in the number of feedback data (the storage number).

As shown by the solid line 401, in general, the prediction accuracy of the learning model decreases in accordance with the operation time. In contrast, as shown by the dotted line 402, the number of feedback data increases in accordance with the operation time. When the number of feedback data exceeds a predetermined number, the continuous learning cycle execution unit 318 executes a continuous learning cycle (evaluation, learning, and updating) so that the prediction accuracy increases. In the example of FIG. 4, since the feedback data exceeds a predetermined number (1,000 cases in this example) in the eighth month, the continuous learning cycle execution unit 318 executes the continuous learning cycle, and as a result, the prediction accuracy in the ninth month increases. Additionally, the feedback data are discarded accompanying the execution of the continuous learning cycle. Subsequently, new feedback data are successively stored in the feedback data storage unit 314 of the learning model management system 101. The reason for discarding the feedback data after executing update is to use the latest feedback data.

As described above, in the learning model shown in FIG. 4, the condition under which the evaluation is executed is that the number of feedback data exceeds 1,000. In contrast, during a period of time during which the continuous learning cycle is not executed because the number of feedback data is 1,000 or less (Month 0 to 8), the prediction accuracy of the learning model may continue to deteriorate. Moreover, since the evaluation of the learning model is not actually executed during this period of time, it is difficult for the administrator of this system to notice the degree of deterioration in the prediction accuracy of the learning model. Even if the administrator of this system notices the deterioration in the prediction accuracy of the learning model, the learning data may be insufficient. This is because at least a part of the feedback data and an input parameter corresponding thereto are used for the learning data for relearning. In the period of time during which the continuous learning cycle described above is not executed, the absolute number of the feedback data is small, so that relearning cannot be executed without change. Therefore, the prediction accuracy is difficult to improve even by updating and replacing the learning model.

As can be seen from the above description, when the speed at which the number of feedback data increases is smaller than the speed at which the prediction accuracy of the learning model deteriorates, the time interval at which the continuous learning cycle is executed becomes long. Therefore, there is a concern that the learning model is operated in a state in which the prediction accuracy deteriorates.

In contrast, in the present embodiment, even if the time interval at which the continuous learning cycle is executed is long because the increase in the number of feedback data is small, the prediction accuracy of the learning model can be maintained at a sufficiently high level by the mechanism below.

Figure 5:
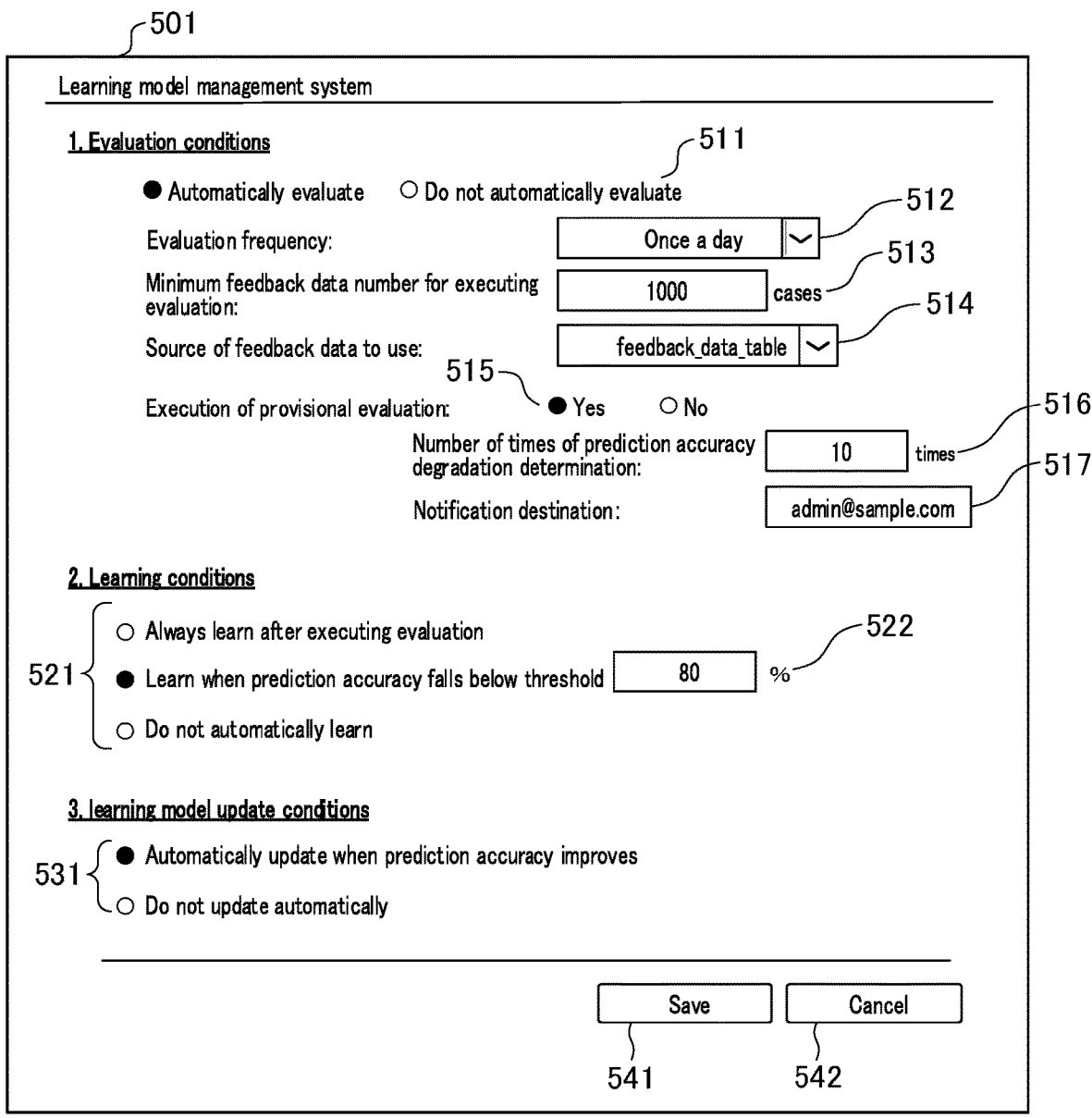
FIG. 5 is a conceptual diagram illustrating a screen for setting a continuous learning cycle in a model management system according to each embodiment.

Hereinafter, the learning model according to the present embodiment will be described with reference to FIG. 5 and FIG. 6. FIG. 5 is a conceptual diagram showing a screen for setting parameters of the continuous learning cycle according to the present embodiment.

A screen 501 in FIG. 5 is displayed on the display unit 343 by the Web browser 340 based on the Web application provided from the Web application management unit 312 of the learning model management system 101 to the terminal 104.

In the present embodiment, the operation of the screen 501 is performed by the administrator of the learning model 322 that is in operation. As can be seen from FIG. 5, settings related to "evaluation condition", "learning condition", and "model update condition" are performed on the screen 501.

In the settings of "evaluation condition", a radio button 511 is a setting button for selecting whether or not to allow the learning model evaluating unit 315 to automatically execute the evaluation of the learning model 322 that is in operation, in other words, whether or not to automatically execute the continuous learning cycle. When "automatically evaluate" is selected by the radio button 511, the settings from a pull-down menu 512 are performed. In contrast, when "do not automatically evaluate" is selected by the radio button 511, the settings from the pull-down menu 512 are not performed.

In order to improve the prediction accuracy of the learning model 322 that is in operation, it is desirable that "automatically evaluate" is always selected by the radio button 511. However, in view of the limitation of the computer resources of the learning model management system 101 and the case in which the system of the present embodiment is provided as "SaaS" based on a pay-as-you-go-basis, selecting "do not automatically evaluate" is allowed in the UI of the present embodiment. For the same reason, the UI of the present embodiment includes other setting items that are not optimized, and not all setting items are necessary for the present invention.

The pull-down menu 512 is a setting button for setting the frequency at which the learning model evaluating unit 315 evaluates the learning model 322 that is in operation. A text box 513 is used to set the number of feedback data required for the learning model evaluation unit 315 to evaluate the learning model 322 that is in operation (hereinafter, referred to as "minimum feedback number").

Specifically, the continuous learning cycle execution unit 318 causes the learning model evaluation unit 315 to evaluate the learning model 322 that is in operation each time the number of feedback data that can be used for evaluation exceeds the minimum feedback number. In contrast, when the number of feedback data that can be used for evaluation does not satisfy the minimum feedback data number, the continuous learning cycle execution unit 318 determines that a reliable evaluation result cannot be obtained, and does not execute the evaluation of the learning model 322 that is in operation.

A pull-down menu 514 is a setting button for selecting a source of the feedback data to be used when the learning model evaluation unit 315 executes evaluation. In the present embodiment, the table of Table 2 is selected.

A radio button 515 is a setting button for specifying whether or not the continuous learning cycle execution unit 318 causes the learning model evaluation unit 315 to execute a "provisional evaluation", which is a feature of the present embodiment.

A text box 516 is used to set the number of times for prediction accuracy degradation determination. As will be described below, the continuous learning cycle execution unit 318 determines whether or not the prediction accuracy of the learning model 322 that is in operation deteriorates when the number of times of "provisional evaluation" has reached the number of times of prediction accuracy degradation determination.

When it has been determined that "Prediction accuracy of the learning model 322 that is in operation may deteriorate" as described above, a text box 517 is used to specify a destination that provides a notification about the determination. As will be described below, under the control of the continuous learning cycle execution unit 318, the feedback data collection notification unit 319 provides a notification about the necessity to collect the feedback data to the destination specified by the text box 517. In the present embodiment, the destination of the administrator of the learning model 322 that is in operation is specified by the text box 517. The settings of the above "evaluation condition" will be described in detail below with reference to FIG. 6.

In the settings of "learning condition", when "automatically evaluate" is selected by the radio button 511, a radio button 521 is used for the settings associated with this selection. Specifically, regarding the relearning after evaluating the learning model 322 that is in operation, the radio button 521 is used to select one of "Always learn after executing an evaluation", "Learn when prediction accuracy falls below a threshold", and "Do not automatically learn".

A text box 522 is a text box for specifying a threshold when "Learn when prediction accuracy falls below a threshold" has been selected by the radio button 521.

In the settings for "model update condition", when the radio buttons 511 and 521 are set to automatically perform both evaluation and learning, a radio button 531 is used to perform a selection associated with this selection. Specifically, when "automatically evaluate" is selected by the radio button 511 and "always learn after executing evaluation" or "learn when prediction accuracy falls below a threshold" is selected by the radio button 521, the settings for the radio button 531 becomes effective. When "Automatically update when prediction accuracy improves" is selected by the radio button 531, the continuous learning cycle execution unit 318 causes the learning model evaluation unit 315 to evaluate the learning model obtained by relearning. When the prediction accuracy is higher than the prediction accuracy of the learning model 322 that is in operation, the continuous learning cycle execution unit 318 causes the learning model update instruction unit 317 to update the learning model 322 that is in operation. In contrast, when "do not automatically update" is selected by the radio button 531, the update of the learning model 322 that is in operation is not automatically performed.

A save button 541 is used to save the setting contents on the screen 501. A cancel button 542 is used to discard the setting contents on the screen 501.

Figure 6:
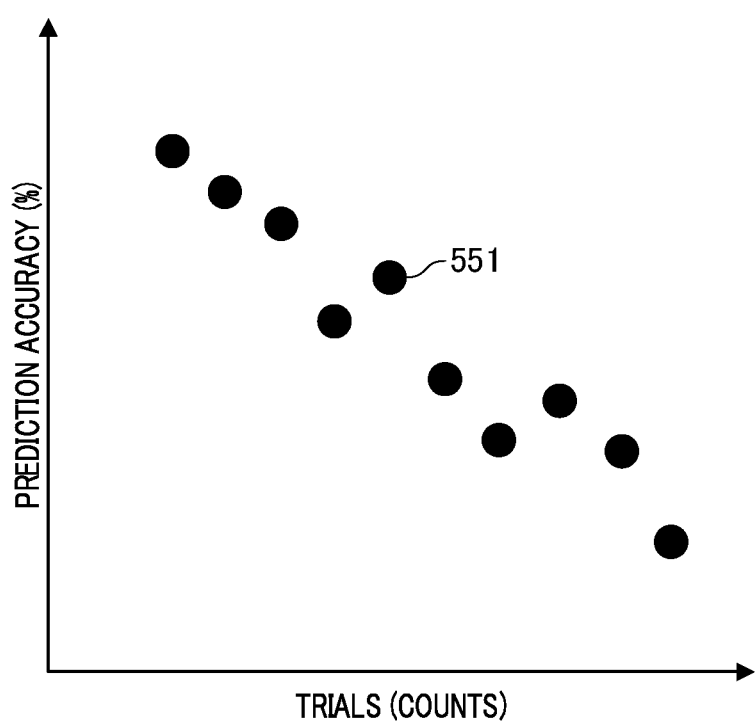
FIG. 6 is a graph illustrating the relation between the prediction accuracy when the learning model according to each embodiment deteriorates and the number of trials.

FIG. 6 is a graph for explaining the provisional evaluation for the learning model 322 that is in operation, and shows the correlation between the number of trials and the provisional evaluation result (prediction accuracy). Referring now to FIG. 6, a description will be given of a method for the provisional evaluation process according to the present embodiment, that is, a method for causing the continuous learning cycle execution unit 318 to determine whether or not there is a possibility that the prediction accuracy of the learning model 322 that is in operation will deteriorate by using the result for the provisional evaluation.

Here, the provisional evaluation is executed when the number of feedback data usable for evaluation does not reach the minimum feedback data number set in the text box 513 but reaches the predetermined number set for provisional evaluation.

Although the evaluation method of the provisional evaluation is the same as the ordinary evaluation method in that the continuous learning cycle execution unit 318 executes the continuous learning cycle, the process after evaluation is different. In the description below, in order to distinguish between these two types of evaluation methods, the evaluation processing executed when the minimum feedback data number (above) is satisfied is referred to as "definite evaluation", and the evaluation processing executed when the minimum feedback data number is not satisfied is referred to as "provisional evaluation". These definite evaluation and provisional evaluation are executed by the learning model evaluation unit 315 based on an instruction from the continuous learning cycle execution unit 318.

The provisional evaluation is executed by the learning model evaluation unit 315 in a state in which the number of feedback data is less than the minimum feedback data number, so a reliable evaluation result cannot be obtained. However, by repeating the provisional evaluation a plurality of times by the learning model evaluation unit 315, it is possible to confirm the change tendency of the prediction accuracy of the learning model 322 that is in operation. Points 551 plotted in FIG. 6 are each a "predictive accuracy" calculated by the provisional evaluation for the learning model 322 that is in operation.

The continuous learning cycle execution unit 318 executes the provisional evaluation the number of times specified by the text box 516 (10 times in the present embodiment). Subsequently, the correlation coefficient of these provisional evaluation results (predictive accuracy) is calculated. If the calculated correlation coefficient shows a strong negative correlation (for example, −0.7 or less), the continuous learning cycle execution unit 318 determines that the definite evaluation needs to be performed. As described above, in order to perform the definite evaluation, collecting more feedback data than the minimum feedback data number is necessary. Hence, the continuous learning cycle execution unit 318 provides an instruction to perform a notification that the feedback data should be collected to the destination specified by the text box 517 to the feedback data collection notification unit 319 (to be described below).

Figure 7:
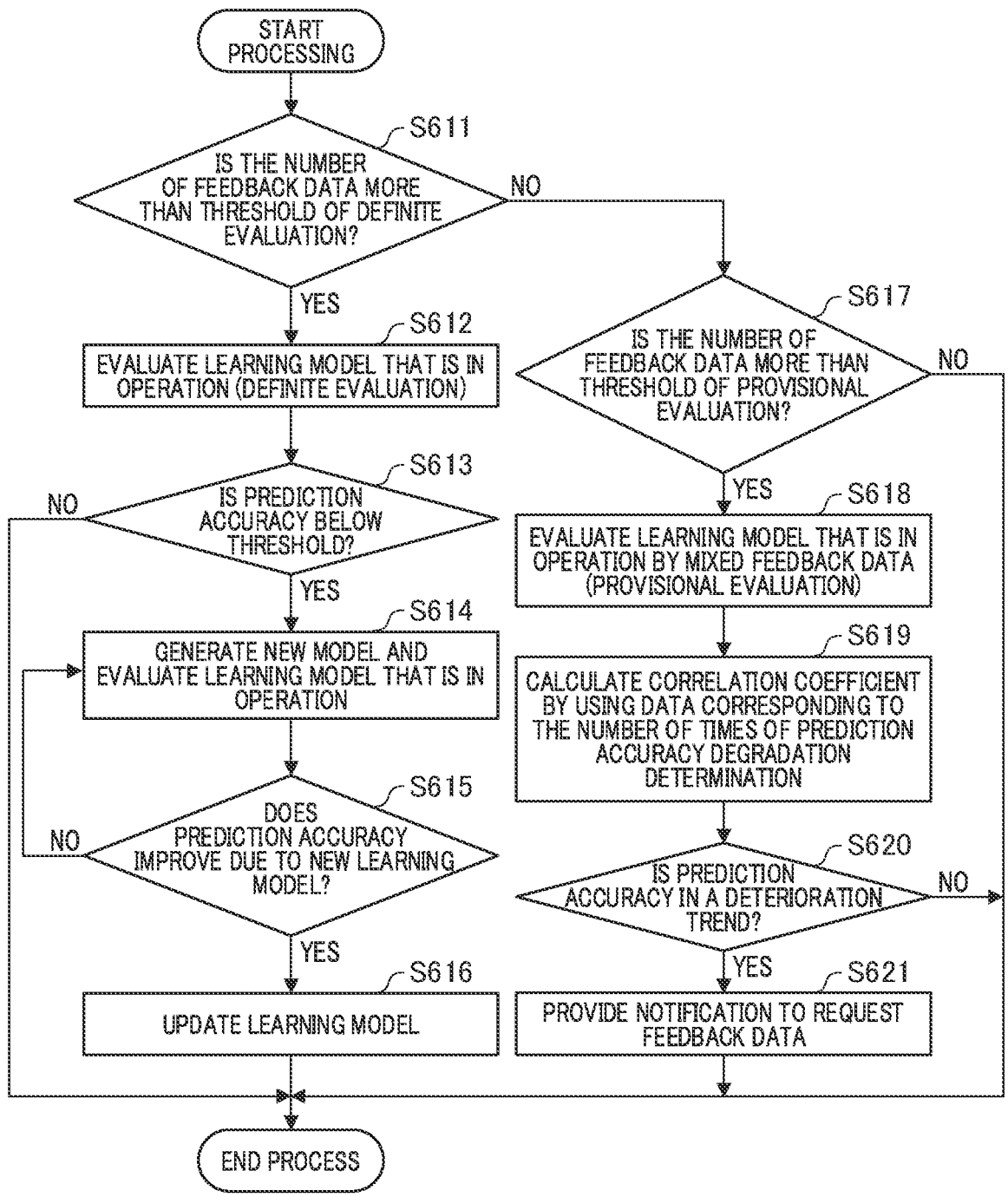
FIG. 7 is a flowchart for explaining the continuous learning cycle according to each embodiment.

FIG. 7 is a flowchart for explaining the continuous learning cycle executed by the continuous learning cycle executing unit 318. Although the processing procedure of the continuous learning cycle execution unit 318 is different depending on the setting contents related to the continuous learning cycle (refer to FIG. 5), a case in which each setting shown on the screen 501 is the same will be described.

First, in step S611, the continuous learning cycle execution unit 318 checks the source specified by the pull-down menu 514. Subsequently, the continuous learning cycle execution unit 318 compares the number of feedback data that can be used for evaluation with a threshold (the minimum feedback data number specified in text box 513, hereinafter, referred to as "first minimum feedback data number"). As the result for the comparison, if the number of feedback data that can be used for evaluation exceeds the first minimum feedback data number, the process proceeds to step S612, and the process for "the definite evaluation" is executed. In contrast, if the number of feedback data that can be used for evaluation is equal to or less than the first minimum feedback data number, the process proceeds to step S617, and the process for "provisional evaluation" is executed.

In step S612, the continuous learning cycle execution unit 318 causes the learning model evaluation unit 315 to execute the definite evaluation of the learning model 322 that is in operation. Feedback data corresponding to the source specified by the pull-down menu 514 is used for this definite evaluation.

Subsequently, in step S613, the continuous learning cycle execution unit 318 compares the "prediction accuracy", which is the evaluation result in step S612, with the threshold specified in the text box 522. If the prediction accuracy is equal to or greater than the threshold, the process ends. As a result, the learning model 322 that is in operation continues to be operated without being updated.

In contrast, if it is determined in step S613 that the prediction accuracy is lower than the threshold, the process proceeds to step S614. In step S614, the continuous learning cycle execution unit 318 causes the learning model learning unit 316 to relearn the learning model (generation of a new learning model). In this relearning, the feedback data of the source specified by the pull-down menu 514 is used.

Moreover, the continuous learning cycle execution unit 318 causes the learning model evaluation unit 315 to execute the definite evaluation of the new learning model created in this step S614. As described above, when the feedback data that has been used for learning the learning model is also used for evaluating the learning model, it becomes difficult to obtain a reliable evaluation result. Therefore, in step S614 as well, the learning and the definite evaluation are performed by using feedback data that differ from each other.

Next, in step S615, the continuous learning cycle execution unit 318 compares the prediction accuracy of the new learning model evaluated in step S614 with the prediction accuracy of the learning model 322, which is in operation, evaluated in step S612. If the prediction accuracy of the new learning model is higher than the prediction accuracy of the learning model 322 that is in operation, the process proceeds to step S616.

If the continuous learning cycle execution unit 318 determines in step S615 that "the prediction accuracy of the new learning model is not higher than the prediction accuracy of the learning model 322 that is in operation", the process may return to step S614, and may change the ratio of the data to be used for learning and the data to be used for evaluation, and may cause both the learning model learning unit 316 to perform relearning and the learning model evaluation unit 315 to execute evaluation again. By repeating the relearning and evaluation until "the prediction accuracy of the new learning model is higher than the prediction accuracy of the learning model 322 that is in operation" is determined in step S615 or until the number of times of execution of the relearning and evaluation reaches a predetermined upper limit, the possibility of creating a learning model with high prediction accuracy can be increased.

In step S616, the continuous learning cycle execution unit 318 provides an instruction to update the learning model 322 that is in operation to the learning model update instruction unit 317. Upon receiving this instruction, the learning model update instruction unit 317 provides an instruction to the learning model update unit 323 to update (deploy) the learning model 322 that is in operation to the new learning model created in step S614.

As described above, if it is determined in step S611 that the number of feedback data that can be used for evaluation is equal to or less than the first minimum feedback data number, the process proceeds to step S617, and the process for "provisional evaluation" is executed.

In step S617, the continuous learning cycle execution unit 318 checks the source specified by the pull-down menu 514 and compares the number of feedback data that can be used for provisional evaluation with a predetermined threshold (hereinafter, referred to as "second minimum feedback data number"). As the result for this comparison, if the number of feedback data that can be used for provisional evaluation exceeds the second minimum feedback data number, the process proceeds to step S618, and if not, the process ends. Here, the second minimum feedback data number is smaller than the first minimum feedback data number, and is defined as, for example, 10% of the first minimum feedback data number.

Next, in step S618, the continuous learning cycle execution unit 318 causes the learning model evaluation unit 315 to execute provisional evaluation of the learning model 322 that is in operation. Feedback data corresponding to the source specified by the pull-down menu 514 is used for this provisional evaluation. Subsequently, in step S619, the continuous learning cycle execution unit 318 calculates a correlation coefficient by using the provisional evaluation result corresponding to the number of times of determination specified by the text box 516.

In step S620, the continuous learning cycle execution unit 318 determines whether or not the prediction accuracy is in a deteriorating trend (whether or not there is a strong negative correlation) based on the correlation coefficient calculated in step S619. If it is determined that the prediction accuracy is in a deterioration trend, the process proceeds to step S621, and if it is determined that the prediction accuracy is not in a deterioration trend, the process ends.

In step S621, the continuous learning cycle execution unit 318 provides an instruction to the feedback data collection notification unit 319 to provide a notification to the destination specified by the text box 517. As described above, this notification is a notification causing the administrator to collect feedback data for executing the definite evaluation.

As described above, according to the present embodiment, when the number of feedback data is small, it is possible to determine whether or not the prediction accuracy of the learning model 322 that is in operation is in a deterioration trend by performing provisional evaluation of the learning model 322 that is in operation. When it is determined that the prediction accuracy is in a deterioration trend, a notification for causing the collection of the feedback data is provided so that the administrator can confirm the timing at which the collection of the feedback data is required. Further, the continuous learning cycle is subsequently executed by using the feedback data collected to avoid the inconvenience that the learning model with low prediction accuracy is continuously operated.

Embodiment 2

In Embodiment 1 described above, a mechanism has been described in which when the number of feedback data is small and the definite evaluation of the learning model 322 that is in operation cannot be executed, the deterioration tendency of the prediction accuracy is detected by performing the previous evaluation, and the administrator is caused to collect the feedback data for executing the definite evaluation.

However, it is difficult for the administrator of the learning model 322 that is in operation to determine from which user the feedback data should be collected in order to improve the prediction accuracy of the learning model. For example, when it is desired to operate a learning model that performs a prediction for a general user, it is desirable that there is a variation in each attribute of the feedback data to be collected in order to avoid overlearning. In contrast, when it is desired to operate a learning model that performs a prediction by focusing on a user having a specific attribute as a target, it is desirable to avoid collecting feedback data other than the target data as much as possible from the viewpoint of the collection cost of the feedback data. Hence, in the present embodiment, in addition to the notification according to Embodiment 1 described above, a mechanism for performing a recommendation to the administrator so as to collect the feedback data from a user having a desired attribute is provided.

In the present embodiment, only matters different from those in Embodiment 1 will be described, and descriptions of shared matters will be omitted.

FIG. 8 is an example of a setting screen for setting an attribute to be collected intensively. FIG. 9 is a table showing an example of the contents about which the administrator is notified as a recommendation result by the continuous learning cycle execution unit 318. In FIG. 8, a screen 701 is a screen that can be set when the item "execution of the provisional evaluation" is set to "Yes" by the radio button 515 on the screen 501.

A radio button 711 is a setting button used to set enable/disable the function of recommending a user who is a target for collection of feedback data. If "Yes" is selected bn the radio button 711, the recommendation function is enabled, and if "No" is selected, the recommendation function is disabled.

A pull-down menu 721 is used to specify the source in which the information about the user who is a target for collection of feedback data is stored. For example, in the pull-down menu 721, a table to be used as a source is specified from among a plurality of tables (refer to Table 1) stored in the user information storage unit 313.

A pull-down menu 722 is used to specify the source of the feedback data used by the continuous learning cycle execution unit 318 in order to determine a missing attribute value.

A pull-down menu 723 is used to specify an attribute map. In the present embodiment, the attribute map defines a range in which a missing attribute value can be obtained or a range in which an attribute value to be collected by limiting a condition can be obtained. Hereinafter, an example of the attribute map is shown in YAML (Yaml Ain't Markup Language) format.

```
Definition of Attribute Map ###
Attribute Map:
  gender:
    attribute Name: Gender
    values:
      - Male
      - Female
    value Type: Gender
  age:
    attribute Name: Age
    values:
      - 15-19
      - 20-24
      - 25-29
      - 30-34
```

```
        - 35-39
        - 40-44
        - 45-49
    - ...
    value Type: range <int>
    unit: age
family Structure:
    attribute Name: Family Structure
    values:
        - One adult
        - Two adults
        - One adult, one child
        - One adult, two children
        - Two adults, one child
        - Two adults, two children
    - ...
    value Type: FAMILY_STRUCTURE
Income:
    attribute Name: Annual Income
    values:
        - 200-399
        - 400-599
        - 600-799
        - 800-999
    - ...
    Value Type: range <int>
    unit: ten thousand
```

In the attribute map described above, the attributes "gender", "age", "family Structure", and "income" respectively correspond to "gender", "age", "family Structure", and "annual income" in Table 2 described above. The definition of each attribute is associated with the input data items shown in Table 2. For example, regarding the attribute "income", "annual income" is specified as a value of "attribute Name", the range in which the value can be obtained is defined by "values", the format of the value is defined by "value Type", and the unit of the value is defined by "unit".

In FIG. 8, a radio button 731 is a button for specifying a user attribute to be recommended. When "Prefer a user having a missing attribute" is selected by the radio button 731, the continuous learning cycle execution unit 318 recommends a user having such an attribute that the variation in the number of the homogeneous data becomes small in each attribute. Here, the "homogeneous data" in each attribute refers to the value of the "values" of the attribute map specified by the pull-down menu 723, and the "variation" refers to the value of variance in the probability theory. The user to be recommended is extracted from a user corresponding to the feedback data that has been specified by the pull-down menu 722.

In contrast, when "Specify an attribute of a user who is a target for collection of feedback data" is selected by the radio button 731, the continuous learning cycle execution unit 318 recommends a user having each attribute specified by items 741.

In the items 741, each attribute defined by the attribute map specified by the pull-down menu 723 is displayed together with a check box. Subsequently, an attribute to be specified can be selected by checking a desired check box. Further, in the items 741, pull-down menus are displayed corresponding to each attribute. By using these pull-down menus, one of the values can be selected from the options corresponding to each attribute. Although not shown in the screen 701, a plurality of options may be selected for one attribute.

In accordance with the above settings, the continuous learning cycle execution unit 318 creates a recommendation result shown in FIG. 9 when executing the process of step S621 described in Embodiment 1. Subsequently, the continuous learning cycle execution unit 318 causes the feedback data collection notification unit 319 to provide a notification to the destination specified by the text box 517 (refer to FIG. 5).

In FIG. 9, a specified result 781 is an attribute of a collection target, and its value that has been selected when the continuous learning cycle execution unit 318 creates a recommendation result.

A list 782 is a recommendation result for the feedback data collection target user created by the continuous learning cycle execution unit 318. Here, the user included in the list 782 is the user recorded in the source of the user information specified by the pull-down menu 721. However, since the specified result 781 is included in the notification information, it is also possible to collect feedback data from a user (refer to Table 1) other than those registered in the learning model management system 101.

A radio button 751 is a button that selects whether or not to directly request the user included in the list 782 to provide feedback. When "Yes" is selected by the radio button 751, the user is directly requested to provide feedback in accordance with the setting results for each of forms 761 to 763 to be described below. In contrast, when "No" is selected by the radio button 751, the user is not requested to provide feedback.

The pull-down menu 761 is used to specify an attribute name of a destination mail address (for example, "E-mail address" in Table 1) when the continuous learning cycle execution unit 318 sends a request mail to the user in the list 782.

In the text box 762, the description in the field of the subject for the feedback request e-mail that the continuous learning cycle execution unit 318 sends directly to the user in the list 782 is input. In the text box 763, the text of the feedback request e-mail that the continuous learning cycle execution unit 318 sends directly to the user in the list 782 is input.

When the text is input into the text box 763, a URL of a Web site for allowing the user to input feedback data may be included as in the example of FIG. 7. Alternatively, a form for allowing the user to input feedback data may be included in the text by using an HTML mail.

In the present embodiment, although the electronic mail is used as an example of a means for directly requesting the user to provide feedback, the request method is not limited thereto. For example, a method for sending a questionnaire or the like to an address in the list 782 (refer to FIG. 9) by using a mailing system (not illustrated), or a method for sending the contents input in the text box 763 as a message to a telephone number in the list 782 may be used.

A save button 771 is a button for saving the settings of the screen 701. A button 772 is a button for ending the settings without saving the settings of the screen 701.

As described above, when the administrator of the learning model 322 that is in operation performs the settings for the collection method of the feedback data and the notification, a user having an attribute to be collected can be confirmed and the user can be automatically requested to provide feedback.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-211869, filed Nov. 22, 2019, which is hereby incorporated by reference wherein in its entirety.

What is claimed is:

1. A learning model management system that uses a learning model to estimate information to be provided to a user based on user information of the user and to evaluate performance of the learning model, comprising:
   a memory storing instructions; and
   a processor executing the instructions causing the learning model management system to:
   receive an input for specifying a number of feedback data required for performing a definite performance evaluation of the learning model;
   perform the definite performance evaluation of the learning model when a number of feedback data from a providing destination exceeds a first threshold which is the specified number of feedback data;
   perform relearning of the learning model when a deterioration of the performance of the learning model is detected as a result of the definite performance evaluation of the learning model;
   perform a provisional performance evaluation of the learning model when the number of feedback data from the providing destination does not exceed the first threshold and exceeds a second threshold smaller than the first threshold based on the specified number of feedback data; and
   provide a notification corresponding to the deterioration of the performance when the deterioration of the performance of the learning model has been detected based on result from the provisional performance evaluation performed a plurality of times,
   wherein the notification is for requesting an administrator of the learning model management system to collect the first threshold number of feedback data from the providing destination.

2. The learning model management system according to claim 1, wherein whether or not the performance of the learning model deteriorates is determined based on a change tendency of the performance of the learning model obtained based on the result from the provisional performance evaluation performed the plurality of times.

3. The learning model management system according to claim 1, wherein the notification includes information for specifying a target user recommended as a feedback data collection target based on one or more types of user attributes defined in advance.

4. The learning model management system according to claim 3, wherein the notification includes a recommendation list created by extracting the information related to the target user based on the user attributes from a user table stored in advance.

5. The learning model management system according to claim 1, wherein the relearning is executed by using at least a part of data included in the feedback data from the providing destination to serve as learning data.

6. A learning model management method that uses a learning model to estimate information to be provided to a user based on user information of the user and to evaluate performance of the learning model, the method comprising:
   receiving an input for specifying a number of feedback data required for performing a definite performance evaluation of the learning model;
   performing the definite performance evaluation of the learning model when a number of feedback data from a providing destination exceeds a first threshold which is the specified number of feedback data;
   performing relearning of the learning model when a deterioration of the performance of the learning model is detected as a result of the definite performance evaluation of the learning model;
   performing a provisional performance evaluation of the learning model when the number of feedback data from the providing destination does not exceed the first threshold and exceeds a second threshold smaller than the first threshold based on the specified number of feedback data; and
   providing a notification corresponding to the deterioration of the performance when the deterioration of the performance of the learning model has been detected based on result from the provisional performance evaluation performed a plurality of times,
   wherein the notification is for requesting an administrator of the learning model management method to collect the first threshold number of feedback data from the providing destination.

7. A non-transitory storage medium on which is stored a computer program for a learning model management system that uses a learning model to estimate information to be provided to a user based on the user information of the user and to evaluate performance of the learning model, the computer program causing a processor of the learning model management system to execute:
   receiving an input for specifying a number of feedback data for performing a definite performance evaluation of the learning model;
   performing the definite performance evaluation of the learning model when a number of feedback data from a providing destination exceeds a first threshold which is the specified number of feedback data;

performing relearning of the learning model when a deterioration of the performance of the learning model is detected as a result of the definite performance evaluation of the learning model;

performing a provisional performance evaluation of the learning model when the number of feedback data from the providing destination does not exceed the first threshold and exceeds a second threshold smaller than the first threshold based on the specified number of feedback data; and providing a notification corresponding to the deterioration of the performance when the deterioration of the performance of the learning model has been detected based on the result from the provisional performance evaluation performed a plurality of times, wherein the notification is for requesting an administrator of the learning model system to collect the first threshold number of feedback data from the providing destination.

* * * * *